United States Patent [19]

Jovicic

[11] Patent Number: 4,719,807
[45] Date of Patent: Jan. 19, 1988

[54] TURBINE WHEEL METER

[75] Inventor: Jovan Jovicic, Karlsruhe, Fed. Rep. of Germany

[73] Assignee: Johann Baptist Rombach GmbH & Co. KG, Karlsruhe, Fed. Rep. of Germany

[21] Appl. No.: 782,549

[22] Filed: Oct. 1, 1985

[30] Foreign Application Priority Data

Jun. 14, 1985 [DE] Fed. Rep. of Germany ....... 3521410

[51] Int. Cl.$^4$ .............................................. G01F 15/18
[52] U.S. Cl. .................................................. 73/861.92
[58] Field of Search ........... 73/861.83, 861.89, 861.92, 73/861.93, 861.94; 415/201, DIG. 3

[56] References Cited

U.S. PATENT DOCUMENTS

| 3,388,595 | 6/1968 | Last et al. ........................ | 73/861.94 |
|---|---|---|---|
| 3,559,483 | 2/1971 | Freund ............................ | 73/861.83 |
| 3,733,910 | 5/1973 | Evans et al. ..................... | 73/861.92 |
| 4,463,613 | 8/1984 | Schmittner et al. ............. | 73/861.92 |

Primary Examiner—Herbert Goldstein
Attorney, Agent, or Firm—Antonelli, Terry & Wands

[57] ABSTRACT

A turbine wheel meter with a meter housing having a lateral opening, with a measuring insert including an impeller, and a flow regulator being inserted in a duct of the meter housing. The measuring devices can, without removing the same from a length of conduit, be installed, exchanged, and calibrated outside of the meter housing by a corresponding structure of the flow regulator in relation to a discontinuity or gap in the duct, by a plug-in and centering arrangement provided on opposed end faces of the measuring device and the flow regulator device, by a flaring portion of the duct in conjunction with a counter shoulder of the flow regulator, as well as by the use of a clamping element.

9 Claims, 1 Drawing Figure

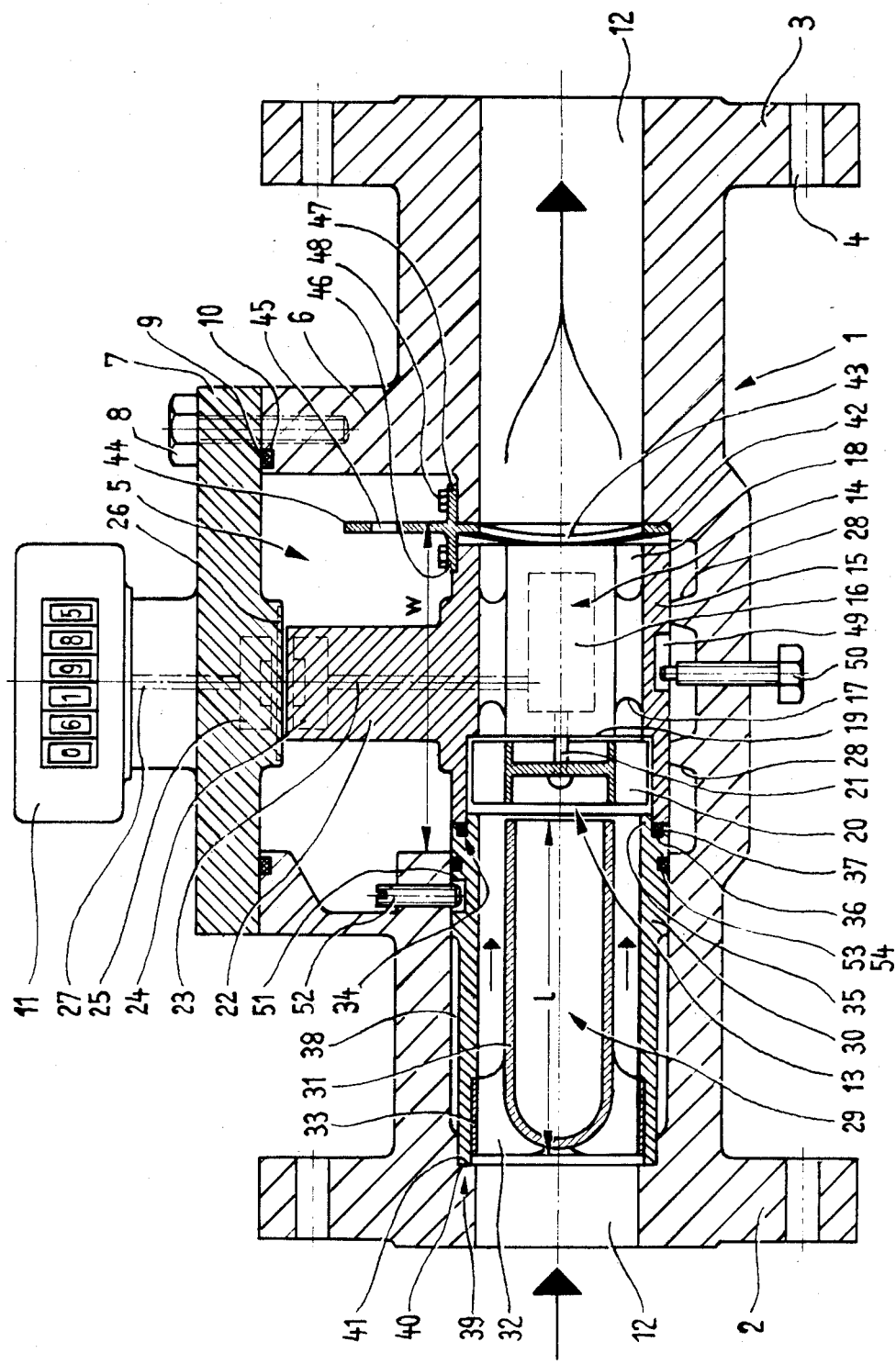

TURBINE WHEEL METER

BACKGROUND OF THE INVENTION

The invention relates to a turbine wheel meter for measuring a volume of a flowing medium, with a meter housing having a lateral opening, being penetrated by a duct having a discontinuity in a zone of the lateral opening, and with a tubular measuring insert disposed in the discontinuity and comprising an impeller and a reversing gear, as well as a flow regulator, arranged on the inlet side in the duct, upstream of the measuring insert, and being in the shape of a displacement member seated in a cylinder sleeve and provided with guide ribs, with a housing lid sealing the opening and carrying a counting mechanism on the outside.

The invention is utilized, in particular, with turbine wheel meters for gas supply systems wherein pipe diameters of four inches and more are used, and large volumes are to be measured at high pressures with great accuracy.

Turbine wheel meters with a straight flow channel have been proposed wherein surrounded by the flow of the medium a measuring insert, with an impeller, is arranged, with a flow regulator being disposed forwardly of the measuring insert. In a number of these meters, such as, for example, the type proposed in DOS No. 2,702,319 the flow divider or regulator and the measuring insert are placed into the flow channel in the longitudinal direction; however, a disadvantage of this arrangement resides in the fact that the turbine wheel meter must be removed from the length of conduit when exchanging those parts due to damage or for maintenance purposes, thereby resulting in a time consuming assembly work which is also rather cumbersome due to the considerable weight of the meter intended for large nominal cross sections.

In, for example, DOS No. 2,066,055, another turbine wheel meter is proposed which includes a meter housing having a lateral access to the flow channel through which the measuring insert with the impeller is introduced; however, a disadvantage of this proposed arrangement resides in the fact that an assembly of the flow divider or regulator takes place by insertion from the front into the flow channel. Consequently, for exchanging a damaged flow regulator, the entire meter housing must be removed from the conduit.

The aim underlying the present invention essentially resides in providing a turbine wheel meter constructed so that not only a measuring insert thereof but also the flow regulator can be removed from the meter housing without disassembly of the entire meter thereby enabling a calibration of the turbine wheel meter and flow regulator outside of the meter housing.

In accordance with advantageous features of the present invention, a turbine wheel meter of the aforementioned type is proposed wherein a length of a cylindrical sleeve of the turbine wheel meter is smaller than an inside diameter of a discontinuity or interruption of a duct of the meter, and the cylindrical sleeve of the flow regulator and measuring insert include plug-in and centering means having neutrally opposed end faces. The duct includes a cylindrical flaring portion emanating from the discontinuity or interruption, with a shoulder, the radial bearing surface of which, extends toward the discontinuity, and the cylindrical sleeve of the flow regulator seated in the flaring portion abuts, with a counter shoulder, the aforementioned shoulder. A circular ring-shaped clamping element is disposed between the measuring insert and the edge of the duct discontinuity or interruption on the discharge side.

By virtue of the above noted features of the present invention, it is possible to remove the measuring insert as well as the flow regulator from the lateral opening of the meter housing in the proposed turbine wheel meter without having to disassemble the entire meter from the length of the conduit. As can readily be appreciated, this means not only a simple assembly at the manufacturing plant but also a ready exchange of these essential components without any problems.

The plug in and centering means proposed by the present invention for releasably joining the two components makes it possible to calibrate or recalibrate the entire measuring device of the meter outside of the meter housing and insert the same only after completion of the calibration operation thereby saving expenses in manufacturing and servicing of the turbine wheel meter.

Advantageously, an end web having the shape of a circular ring which engages into the measuring insert is provided as the plug-in and centering means at the cylinder sleeve. This simple arrangement reliably ensures the position of the measuring insert and the flow regulator with respect to each other inside and outside of the meter housing.

A circular-ring-shaped end groove wherein a sealing ring is seated is suitably located beside the end web. This feature effects sealing of the junction point between the measuring insert and the flow regulator.

According to another feature of the invention, guide means for the measuring insert are provided in the meter housing in the zone of the duct discontinuity, with the guide means imparting to the measuring insert its prescribed location in the radial direction within the duct, and facilitating insertion and removal, respectively, of the flow regulator into and out of the duct.

Suitably, transverse ribs integrally formed in the interior of the meter housing serve as the guide means.

It is advantageous to fashion the clamping element to be spring-elastic. This clamping element, which thus can be utilized under tension, ensures the correct position of the measuring insert and the flow regulator in the axial direction.

The clamping element can carry along its edge a projecting fishplate as well as at least one tang attached at a right angle, with the fishplate facilitating the pulling out of the clamping element, and the aiding in attaching the element either to the meter housing or to the measuring insert.

BRIEF DESCRIPTION OF THE DRAWING

The present invention will be described in greater detail below referring to the drawing wherein:

The single FIGURE is a longitudinal cross-sectional view, on a reduced scale, of a turbine wheel meter constructed in accordance with the present invention.

DETAILED DESCRIPTION

The turbine wheel meter as illustrated in the Single FIGURE of the drawing comprises a capped metal meter housing generally designated by the reference numeral 1 provided with two end-positioned mounting flanges 2, 3 containing mounting bores 4. The turbine wheel meter is inserted into a length of a gas supply conduit by way of the mounting flanges 2, 3.

The meter housing 1 has, in a center area thereof, a lateral opening generally designated by the reference numeral 5 constituted by an integrally formed pipe connection 6, with the opening 5 being sealed by a housing lid 7 by cap screws 8 and a gasket 10 inserted in a groove 9. The housing lid 7 carries at an outer top side thereof a mechanical counting mechanism with, for example, six counting positions.

A cylindrical straight duct 12 extends through the meter housing 1, with the duct 12 having a discontinuity, interruption, or gap generally designated by the reference numeral 13 formed in a zone or area of the lateral opening 5. A gas, the volume of which is to be measured with the turbine wheel meter, flows through the duct 12 in a direction of the four arrows. The discontinuity or gap 13 divides the ducts 12 into two halves, with one half of the duct 12 being disposed on an inlet side and the other half being disposed on an outlet side of the meter housing 1.

A tubular measuring insert generally designated by the reference numeral 14 is inserted in the discontinuity 13 of the duct 12 with the measuring insert 14 comprising a cylindrical wall 15 and a cylindrical gearbox 16, attached with radial holding webs 17 at the cylindrical wall 15, with formation of an annular duct 18. An impeller 20 is arranged on an end face 19 of the measuring insert 14 on the inlet side, with the impeller being rotatable on a shaft 21 supported in the gearbox 16, and with the shaft 21 actuating a reversing and reducing gear accommodated in the gearbox 16.

A rotary shaft 23, with an annular magnet 24 positioned at an end thereof, is mounted in an extension 22 of the measuring insert 14, with the rotary shaft 23 extending out of the gearbox 16 through a web. The annular magnet 24 is disposed in opposition to a second annular magnet 25 and separated therefrom by a gastight diaphragm 26, with the drive shaft 27 of the second annular magnet 24 driving the counting mechanism 11.

Guides for the measuring insert 14 are formed in the shape of two transverse ribs 28 integrally formed in the meter housing 1 in a zone or area of the discontinuity 13 of the duct 12. The measuring insert 14 rests with the cylindrical wall 15 on the two transverse ribs 28, with the transverse ribs 28 being fashioned as two narrow bearing blocks with an approximately semicircular bearing surface.

A flow regulator generally designated by the reference numeral 29 is placed in the duct 12 on the inlet side upstream of the measuring insert 14, with flow regulator 29 including a cylindrical sleeve 30 housing in its interior centrally a hollow displacement member 31 provided with a hemispherical head at one end and open on the discharge side. The displacement member is studded with a circular array of radial guide ribs 32, with the ends of the guide ribs 32 being joined by a ring 33 inserted from the front into the cylindrical sleeve 30.

The length 1 of the cylindrical sleeve 30 is smaller than the inside diameter w of the discontinuity 13 of the duct 12 so that the flow regulator 29, once the husing lid 7 has been removed and the measuring insert 14 has been lifted out, can be removed, after lateral shifting to a place previously occupied by the measuring insert 14, through the opening 5 of the meter housing 1. During the displacement of the flow regulator 29, the latter slides along the transverse ribs 28.

The cylindrical sleeve 30 of the flow regulator 29, as well as the cylindrical wall 15 of the measuring insert 14, exhibit on their end faces mutually opposed plug-in and centering means generally designated by the reference numeral 34. To serve in this capacity, an annular end web 35 is provided in the cylindrical sleeve 30, with the end web 35 extending for some distance with tight fit into the cylindrical wall 15 of the measuring insert 14. An end groove 36, having the shape of a circular ring, is arranged in the cylindrical sleeve 30 beside the end web 35, with a sealing ring 37 being inserted in the end groove 36 and sealingly contacting the end face of the cylindrical wall 15.

The portion of the duct 12 of the meter housing 1 on the inlet side exhibits a cylindrical, flaring portion 38 emanating from the discontinuity 13 and has a shoulder generally designated by the reference numeral 39, the radial, annular bearing surface 40 of which points toward the discontinuity 13. The cylindrical sleeve 30 includes a counter shoulder 41 in the form of its circular end face. The flow regulator 29 is fittingly seated in the flaring portion 38 of the meter housing 1, and the counter shoulder 41 abuts against the shoulder 39. In this way, the position of the flow regulator 29 is accurately fixed in both the axial and radial directions.

A flat, circular-ring-shaped clamping element 43 is inserted between the measuring insert 14 and/or the cylindrical wall 15 and the annular edge 42 of the discontinuity 13 of the duct 12 on the discharge side. The width of the ring of the clamping element 43 coincides with the thickness of the cylindrical wall 15 of the measuring insert 14. The clamping element 43 is designed to be spring-elastic and is preshaped so that it is seated like a spring washer under tension in the interspace between the cylindrical wall 15 and the edge 42 of the duct 12 and urges the flow regulator 29 by way of the measuring insert 14 against the shoulder 39 of the flaring portion 38. Thereby the position of these two parts with respect to the meter housing 1 is clearly fixed in the axial direction.

The clamping element 43, swordlike in cross section, carries at its edge a fishplate 44 with a hole 45 into which can be introduced, for example, a hook-shaped tool for pulling out the clamping element 43. Two short tangs 46 and 47 are attached at a right angle at the base of the fishplate 44, and with the aid of these tangs, the clamping element 43 is releasably attached by screws 48 to the measuring insert 14 as well as to the meter housing 1.

In order to prevent the measuring insert 14 from twisting, a longitudinal groove 49 is arranged in the cylindrical wall 15. A hexagonal screw 50 with a trunnion at the end, penetrating the wall of the meter housing 1, engages into the longitudinal groove 49. The cylindrical sleeve 30 of the flow regulator 29 carries a blind bore 51 engaged by a headless screw 52 seated in the wall of the pipe connection 6, and this retains the flow regulator 29 during its dismounting for the purpose of facilitating separation from the measuring insert 14.

The cylindrical sleeve 30 of the flow regulator 29 carries on its outer wall, close to the discontinuity 13, a radial annular groove 53 accommodating a ring seal 54 so as to prevent the formation of an undesirable bypass of the flow along the outside of the cylindrical sleeve 30.

We claim:
1. Turbine wheel meter for measuring a volume of a flowing medium, the turbine wheel meter including a meter housing having a lateral opening, a duct extend- ing through said housing, said duct having a discontinuity in an area of the lateral opening; a tubular measuring means inserted in the discontinuity through the lateral opening and comprising an impeller and a reversing gear means; a flow regulator means on an inlet side of the duct upstream of the measuring means including a flow displacement member seated in a cylindrical sleeve and provided with guide ribs; a housing lid means for sealing the lateral opening and mounting a counting mechanism on an outside thereof; a length of the cylindrical sleeve is less than an inside diameter of the discontinuity of the duct; the cylindrical sleeve of the flow regulator and the measuring insert means includes plug-in and centering means having mutually opposed end faces; the duct includes a cylindrical, flaring portion emanating from the discontinuity, with a first shoulder forming radial bearing surface of which extending in a direction of the discontinuity, and the cylindrical sleeve seated in the flaring portion abuts, with a counter shoulder, the first shoulder; and a circular-ring-shaped clamping means disposed between the measuring means and an edge of the discontinuity of the duct on a discharge side of the turbine wheel meter.

2. Turbine wheel meter according to claim 1, wherein said plug-in and centering means includes a circular-ring-shaped end web provided at the cylindrical sleeve, said end web being adapted to engage the measuring means.

3. Turbine meter according to claim 2, wherein a circular-ring-shaped end groove is disposed adjacent the end web, and a sealing ring is arranged in the end groove.

4. Turbine meter according to one of claims 1, 2 or 3, wherein guide means for the measuring means are provided in the meter housing in an area of the discontinuity.

5. Turbine meter according to claim 4, wherein said guide means includes integrally formed transverse ribs serve as the guide.

6. Turbine meter according to claim 1, wherein the clamping means includes a spring-elastic element.

7. Turbine meter according to claim 1, wherein the clamping means includes on an edge thereof a projecting fishplate and at least one tang attached thereto and extending at a right angle.

8. Turbine meter according to claim 1, wherein at least two semicircular transverse rib means are provided in the discontinuity for supporting a cylindrical wall portion of the measuring means.

9. A turbine meter according to claim 8, wherein a clamping means including a spring elastic element is interposed between a downstream side of the measuring means and an edge of the discontinuity of the duct.

* * * * *